US012729657B2

(12) United States Patent
Gwidt et al.

(10) Patent No.: US 12,729,657 B2
(45) Date of Patent: Sep. 8, 2026

(54) SYSTEM AND METHOD OF FUEL INJECTION MODE TRANSITIONS FOR AN INTERNAL COMBUSTION ENGINE DURING CYLINDER ACTIVATION AND DEACTIVATION

(71) Applicant: GM Global Technology Operations LLC, Detroit, MI (US)

(72) Inventors: J. Michael Gwidt, Brighton, MI (US); Jeffrey M. Hutmacher, Fowlerville, MI (US); Mark Daniel Carr, Fenton, MI (US); Chinmay Avachat, Rochester Hills, MI (US); Brady Thomas Black, Elmer City, WA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/055,850

(22) Filed: Feb. 18, 2025

(65) Prior Publication Data

US 2026/0243214 A1 Aug. 20, 2026

(51) Int. Cl.
*B60T 7/12* (2006.01)
*F02D 17/02* (2006.01)
*F02D 41/38* (2006.01)

(52) U.S. Cl.
CPC ............. *F02D 41/38* (2013.01); *F02D 17/02* (2013.01); *F02D 2041/389* (2013.01)

(58) Field of Classification Search
CPC .. F02D 41/3094; F02D 41/0087; F02D 37/02; F02D 13/06; F02D 2041/0012; F02D 41/402; F02P 5/045; F02M 69/046; F01L 13/0005; F01L 2013/001
USPC ........................................................ 701/104
See application file for complete search history.

(56) References Cited

U.S. PATENT DOCUMENTS 10,202,910 B2 2/2019 Leone et al.
10,337,444 B2 * 7/2019 Richards ............. F02D 41/3094
2016/0003168 A1 * 1/2016 Leone ................. F02D 41/3094
123/406.47

(Continued)

FOREIGN PATENT DOCUMENTS

DE 102017119210 A1 3/2018
DE 102017128030 A1 5/2018

(Continued)

*Primary Examiner* — Hung Q Nguyen
*Assistant Examiner* — James J Kim
(74) *Attorney, Agent, or Firm* — Vivacqua Crane, PLLC

(57) ABSTRACT

A system and method of operating an internal combustion engine (ICE) having a plurality of cylinders. The system includes port and direct fuel injectors configured to inject fuel to each cylinder and an engine control module (ECM) in communication with the port fuel and direct fuel injectors. The ECM is configured to selectively deactivate and activate each cylinder of the plurality cylinders by either halting or initiating fuel injection into the cylinders and selectively transition fuel injection modes. The ECM is further configured to inject make-up direct injection of fuel into selected cylinders, based in part, on whether the cylinder transitioned from a direct injection (DI) mode into a port fuel injection (PFI) mode, from the DI mode to a port direct injection (PDI) mode, or from a PDI to a PFI mode, whether the cylinder received an actual PFI injection, and other engine variables.

20 Claims, 8 Drawing Sheets

(56) References Cited

U.S. PATENT DOCUMENTS

| | | | | |
|---|---|---|---|---|
| 2019/0120165 | A1* | 4/2019 | Refalo | F02D 41/3854 |
| 2019/0353131 | A1* | 11/2019 | Hakeem | F02D 41/0087 |
| 2020/0277908 | A1* | 9/2020 | Glugla | F16H 61/0213 |

FOREIGN PATENT DOCUMENTS

| | | | |
|---|---|---|---|
| DE | 102020112325 | A1 | 11/2020 |
| EP | 1875069 | A1 | 1/2008 |

* cited by examiner

SYSTEM AND METHOD OF FUEL INJECTION MODE TRANSITIONS FOR AN INTERNAL COMBUSTION ENGINE DURING CYLINDER ACTIVATION AND DEACTIVATION

INTRODUCTION

The present disclosure generally relates to vehicles having internal combustion engines (ICE) having fuel injectors and cylinder deactivation capability, and more particularly to a method and system of fuel injection mode transitions during cylinder activation and deactivation.

Modern vehicles utilize internal combustion engines fuel injection systems that include both port and direct fuel injection systems. Such fuel injection systems are also referred to as dual injection fuel systems. A port fuel injection system, also referred to as PFI, have port injectors located in the intake ports away from the inlet valves and spark plugs. The port injectors injecting fuel into the intake ports cools the incoming air and increases the air density and power-producing potential. A direct fuel injection system, also referred to as DI, have direct injectors located in the combustion. Direct injectors injecting fuel into the combustion chamber and onto the combustion chamber wall lowers the temperature of the combustion chamber, thus enabling a higher compression ratio and improved efficiency.

Modern internal combustion engines are configured to operate in a port injection mode wherein fuel is injected into the manifold, a direction injection mode wherein fuel is injected into the combustion chamber, or simultaneously in port and direction mode wherein fuel is injected both in the manifold and combustion chamber. To increase fuel efficiency, modern internal combustion engines having multiple combustion chambers configured to operate in a deactivation mode, also referred to as cylinder deactivation mode or simply as cylinder deactivation. In cylinder deactivation mode, one or more combustion chambers may be disabled by ceasing fuel delivery to the one or more combustion chamber. The one or more combustion chamber may again be activated by resuming fuel delivery to the one or more combustion chamber as required. The deactivation and/or activation of the one or more cylinder, depending on whether the internal combustion engine is operating in PI and/or DI modes, may result in a brief momentary change in the torque output of the ICE that may be noticed by an occupant of the vehicle.

While internal combustion engines having dual fuel injections systems and cylinder deactivation achieve their objectives, there is a continual need a method and system of fuel transitions between direct and port fuel injection modes to optimize vehicle performance in terms of fuel economy and passenger comfort during cylinder activation and deactivation events.

SUMMARY

According to several aspects, a system and method for operating an internal combustion engine (ICE) having a plurality of cylinders. The system includes port fuel injectors configured to port inject fuel to each cylinder of the plurality of cylinders, direct fuel injectors configured to direct inject fuel to each cylinder of the plurality of cylinders, and an engine control module (ECM) in communication with the port fuel injectors and direct fuel injectors. The ECM is configured to selectively deactivate each cylinder of the plurality cylinders by halting fuel injection into each cylinder of the plurality of cylinders and selectively transition fuel injection modes for each cylinder of the plurality of cylinders between a direction injection (DI) mode, a port fuel injection (PFI) mode, and a port direct injection (PDI) mode.

The ECM includes a non-transitory memory containing instructions when executed by a processor causes the ECM to command a deactivation of at least one of the plurality of cylinders; transition at least one of the plurality of cylinders from the DI mode to the PFI mode, from the DI mode to the PDI mode, or from the PDI mode to the PFI mode; determine a first cylinder is not already disabled during the command to deactivate; determine the first cylinder did NOT transition into a PFI mode during the command to deactivate; determine the first cylinder received an actual PFI injection during the command to deactivate; determine the first cylinder transitioned into a PFI mode during the command and a calculation for a next fuel injection period has NOT started; and inject a first make-up direct injection of fuel into the first cylinder for a next combustion event of the first cylinder.

In an additional aspect of the present disclosure, the instructions when executed by a processor further causes the ECM to: determine the second cylinder is not already disabled during the command to deactivate; determine the second cylinder did NOT transition into a PFI mode during the command to deactivate; determine the second cylinder did NOT receive an actual PFI injection during the command to deactivate; determine the second cylinder transitioned into PDI mode during the command to deactivate; and inject a second make-up direct injection of fuel into the second cylinder for a next combustion event of the second cylinder.

In another aspect of the present disclosure, the instructions when executed by a processor further causes the ECM to: determine the third cylinder is NOT already disabled during the command to deactivate; determine the third cylinder did NOT transition into a PFI mode during the command to deactivate; determine the third cylinder did NOT receive an actual PFI injection during the command to deactivate; determine the third cylinder did NOT transition into PDI mode during the command to deactivate; determine the third cylinder transition into DI mode during the command to deactivate; and inject a third make-up direct injection of fuel into the third cylinder for a next combustion event of the third cylinder.

In another aspect of the present disclosure, the instructions when executed by a processor further causes the ECM to: determine a firing sequence of the plurality of cylinders; inject the first make-up direct injection of fuel into the first cylinder, inject the second make-up direct injection of fuel into the second cylinder, and inject the third make-up direct injection of fuel into the third cylinder corresponding to the determined firing sequence of the plurality of cylinders.

In another aspect of the present disclosure, the transition at least one of the plurality of cylinders from DI mode to PFI mode, from DI mode to PDI mode, or from PDI mode to PFI mode occurs in in sequence corresponding to the determined firing sequence of the plurality of cylinders after the command to deactivate.

In another aspect of the present disclosure, the instructions when executed by a processor further causes the ECM to: determine the transition of at least one of the plurality of cylinders from the DI mode to the PFI mode, from the DI mode to the PDI mode, or from the PDI mode to the PFI mode occurred after the command to deactivate and determined at least one of the plurality of cylinders received an actual PFI injection of fuel before determining at least one of the first, second, or third cylinder is NOT already disabled.

In another aspect of the present disclosure, the commanded deactivation of at least one of the plurality of cylinders includes halting fuel injection to the at least one of the plurality of cylinders.

In another aspect of the present disclosure, the ECM is further configured to selectively command activation of disabled cylinders. The instructions when executed by a processor further causes the ECM to: command activation of at least one disabled cylinder; determine the at least one disabled cylinder is transitioning from direction injection (DI) mode to port fuel injection (PFI) mode; determine a port fuel injection (PFI) of fuel into the at least one disabled cylinder is late based on a predetermined window of fuel injection opportunity; and inject a make-up direct injection of fuel into the at least one disabled cylinder.

In another aspect of the present disclosure, the instructions when executed by a processor further causes the ECM to: determine at least one enabled cylinder is transitioning from DI mode to PDI mode; determine the at least one enabled cylinder received an actual PFI injection; and inject make-up DI of fuel to the at least one disabled cylinder.

In another aspect of the present disclosure, the instructions when executed by a processor further causes the ECM to: determine the fuel injection mode is transitioning from at least one of a direct injection (DI) mode to a port fuel injection (PFI) mode, and DI mode to port direct injection (PDI) mode during the command to activate of the at least one cylinder at the time of the command activation.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way

DETAILED DESCRIPTION

Figure 1:
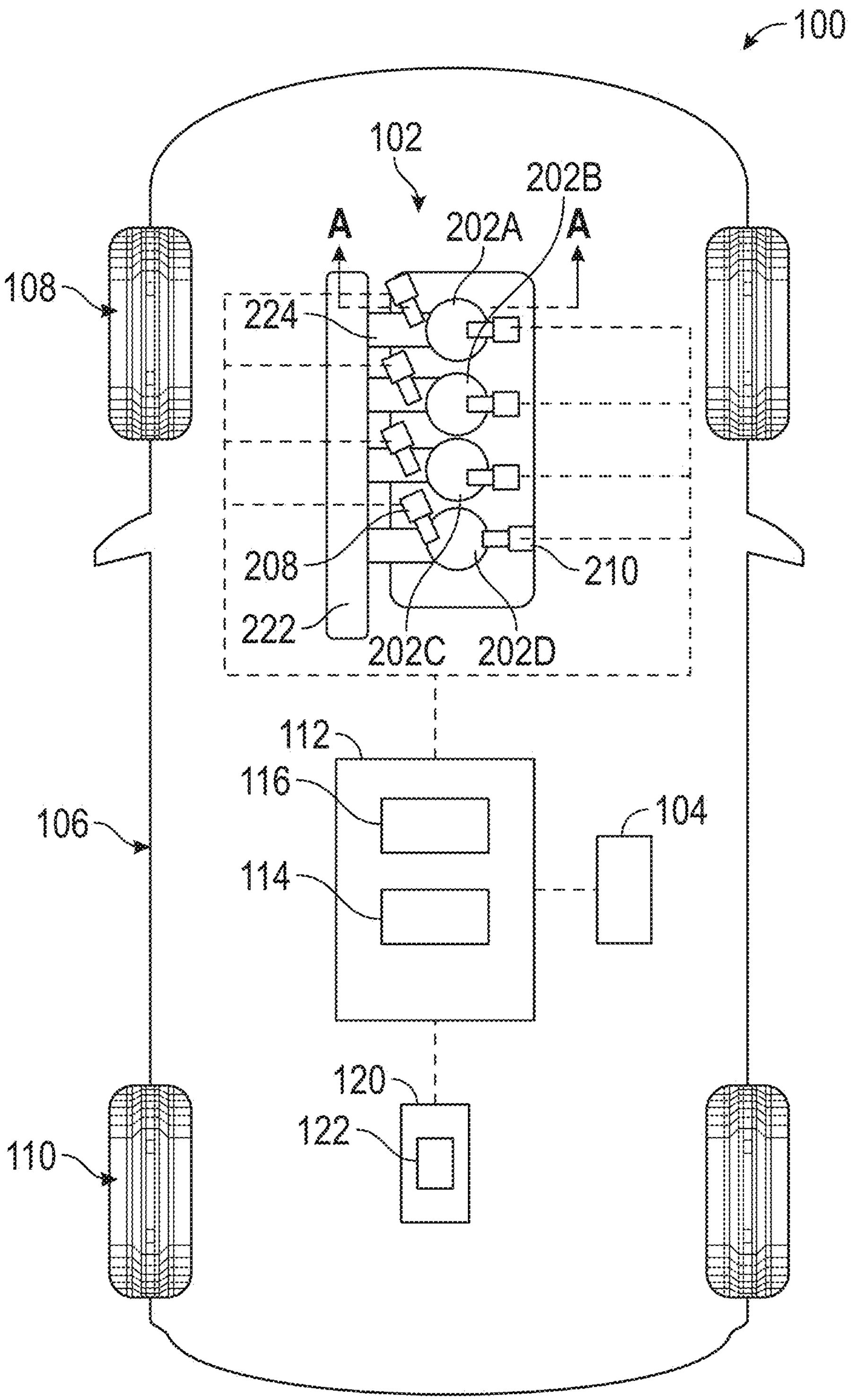
FIG. 1 is a functional diagram of a vehicle having an internal combustion engine, according to an exemplary embodiment.

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

As used herein, the terms module, component module, control module, or controller refer to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may conduct a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

The connecting lines shown in the various figures contained herein are intended to represent example functional relationships and/or physical couplings between the various elements. Conventional techniques may be used for signal processing, data transmission, signaling, control, and other functional aspects of the systems (and the individual operating components of the systems) may not be described in detail herein. It should be noted that many alternative or additional functional relationships or physical connections may be present in an embodiment of the present disclosure.

Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

FIG. 1 is a functional diagram of a vehicle 100 having a spark ignition gasoline internal combustion engine 102. For brevity, the spark ignition gasoline internal combustion engine 102 is also referred to as the internal combustion engine 102 or ICE 102. The vehicle 100 may be manually operated and/or operated by an intelligent system 104, such as an Advance Driver Assistance System (ADAS) and/or an Automated Driving System (ADS), capable of Level 0 (no driving automation) to Level 5 (full driving automation) in accordance with SAE J3016 levels of driving automation. The vehicle 100 generally includes a body 106, front wheels

108, and rear wheels 110. The front wheels 108 and the rear wheels 110 are each rotationally coupled to the body 106 near respective corners of the body 106. The ICE is mechanically connected to at least one of the front wheels 108 and back wheels 110 through a series of gear boxes and mechanical links to transfer torque generated by the ICE 102 to propel the at least one of the front wheels 108 and back wheels 110. Although the vehicle 100 is shown as a sedan, it is envisioned that that the vehicle 100 may include other types of on-road vehicle, such as a pickup truck, a coupe, a sport utility vehicle (SUVs), a recreational vehicle (RVs), and a motorcycle.

Figure 2:
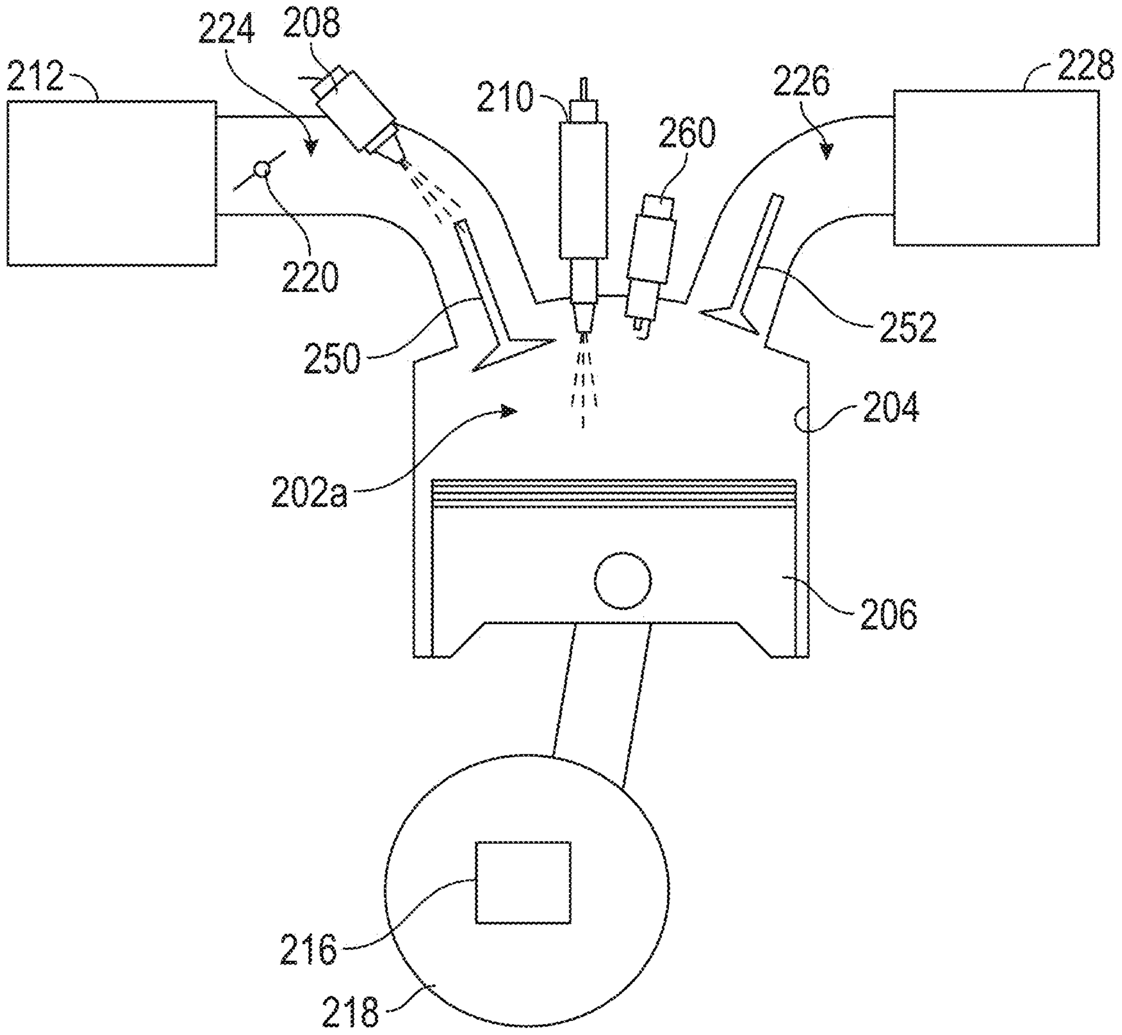
FIG. 2 is an illustration of a cross-section of a cylinder of the internal combustion engine, according to an exemplary embodiment.

FIG. 2 shows a schematic illustration of a cross section of a single internal combustion chamber 202A along section line A-A of the ICE 102 shown in FIG. 1. Referring to both FIG. 1 and FIG. 2, the ICE 102 includes a plurality of internal combustion chambers 202A, 202B, 202C, 202D. In the non-limiting embodiment shown, the ICE 102 includes four combustion chambers 202A, 202B, 202C, 202D in a straight inline configuration. The internal combustion chamber 202A, representative of the other combustion chambers 202B, 202C, 202D, is shown having an internal wall 204 defining a cylinder shaped volume capable of receiving a piston 206. In the embodiment shown, the internal combustion chamber 202 is also referred to as a cylinder 202A due to the cylinder shaped volume. However, it should be appreciated that the combustion chamber 202 may be any shape that is capable of receiving a piston 206 having a corresponding shape. The piston 206 is capable of reciprocating motion sliding against the internal wall 204 of the combustion chamber 202A. The piston 206 is coupled to a crankshaft 218 so that the reciprocating motion of the piston 206 is translated into rotational motion of the crankshaft 218.

The ICE 102 includes both port fuel injectors 208 and direct fuel injectors 210 that are controlled by an engine control module 112, ECM 112, receiving inputs from a vehicle operator and/or intelligent system 104. In one embodiment, the vehicle operator inputs a command for a change in torque via an input device 120 such as an accelerator pedal 120 having a pedal position sensor 122. The pedal position sensor 122 outputs a proportional pedal position signal to the ECM 112 to effectuate a change in torque by at least controlling the port fuel injectors 208 and direct injectors 210. In another embodiment, the intelligent system 104 outputs a signal to the ECM 112 to effectuate a change in torque output by the ICE 102 by at least controlling the port fuel injectors 208 and direct injectors 210.

The ECM 112 includes at least one processor 114 and a non-transitory computer readable storage device or media 116. The non-transitory computer readable storage device or media 116 includes machine-readable instructions that when executed by the processor 114, cause the processors 114 to execute the Method 600 and Method 700 as described below. The processor 114 may be a custom made or commercially available processor, a central processing unit (CPU), a graphics processing unit (GPU), an auxiliary processor among several processors associated with the ECM 112, a semiconductor-based microprocessor (in the form of a microchip or chip set), a macro processor, a combination thereof, or generally a device for executing instructions. The computer readable storage device or media 116 may include volatile and nonvolatile storage in read-only memory (ROM), random-access memory (RAM), and keep-alive memory (KAM), for example. The vehicle computer-readable storage device or media 116 may be implemented using a number of memory devices such as PROMs (programmable read-only memory), EPROMS (electrically PROM), EEPROMs (electrically erasable PROM), flash memory, or another electric, magnetic, optical, or combination memory devices capable of storing data, some of which represent executable instructions, used by the ECM 112. While only one ECM 112 is described, portions of the Method 600 and Method 700 may be executed by multiple distributed ECM or individual processors having the configuration described above.

The ECM 112 may receive various signals from multiple sensors coupled to the ICE 102. The multiple sensors includes measurement of inducted mass air flow (MAF) from mass air flow sensor 212; a profile ignition pickup signal (PIP) from Hall effect sensor 216 coupled to a crankshaft 218; throttle position (TP) from a throttle position sensor; absolute manifold pressure signal (MAP) from a MAP sensor; coolant temperature sensor; and any other sensors necessitated for the efficient operation of the ICE 102. Engine speed signal, RPM, and engine angle may be generated by the ECM 112 from the PIP.

The cylinder 202A can receive intake air via an intake air passage 224. The intake air passage 224 may be part of an intake air manifold 222 (best shown in FIG. 1) having a plurality of air passages that are in communication with the cylinders 202A, 202B, 202C, 202D of the ICE 102. A throttle plate 220 may be provided along the intake passage 224 of for varying the flow rate and/or pressure of intake air provided to cylinder 220A. Exhaust passage 226 can receive combusted exhaust gases from the cylinder 202A.

An exhaust gas sensor 228 is shown coupled to exhaust passage 226 upstream of an emission control device (not shown) such as a three way catalyst (TWC), NOx trap, and various other emission control devices. The exhaust sensor 228 may be any suitable sensor for providing an indication of exhaust gas air/fuel ratio such as an oxygen sensor, a NOx sensor, a HC sensor, a CO sensor, or other sensors configured to detect selected components in the exhaust gases.

The cylinder 202A is shown including at least one intake valve 250 and at least one exhaust valve 252 located at an upper region of cylinder 202A. In the non-limiting embodiment shown, the at least one intake valve 250 and the at least one exhaust valve 252 are shown as poppet type valves, but may include any other types of valves suitable for use in an ICE. The opening, closing, and the lift and duration of the opening and closing of the intake valve 250 and exhaust valve 252 may be controlled by respective valve actuators (not shown) as directed by the ECM 112 based on the load demand of the ICE. The valve actuators may be of the electric valve actuation type or cam actuation type, or a combination thereof. The ECM 112 may command the valve actuators to vary the timing of the intake and exhaust valve opening and/or closing, such as to provide positive or negative valve overlaps, late intake valve closing, etc.

In the embodiment shown, the cylinder 202A is configured with two fuel injectors, a port fuel injector 208 and a direct fuel injector 210, for providing fuel to the cylinder 202A. The port fuel injector 208 is shown disposed in the intake passage 224 upstream of cylinder 202A, as opposed to directly in the cylinder 202A, in a configuration that referred to as port fuel injection (PFI). The port fuel injector 208 may inject fuel in a proportion determined by the ECM. Fuel may be delivered to the port fuel injector 208 from a fuel system (not shown). The direct fuel injector 210 is shown coupled directly to cylinder 202A for injecting fuel directly therein in a proportion determined by the ECM. In this manner, the direct fuel injector 210 provides what is referred to as direct injection of fuel into the combustion cylinder 202A. While FIG. 2 shows the direct fuel injector 210 as an injector located overhead of the piston near the spark plug 260. The direct fuel injector 210 may also be located proximal to the side of the internal wall. Fuel may be delivered to the direct fuel injector 210 from a fuel system (not shown).

Fuel may be delivered by both injectors 208, 210 to the cylinder 202A during a single cycle (4 strokes) of the cylinder. For example, each of the injectors 208 and 210 may deliver a portion of a total fuel injection that is combusted in cylinder 202A. Furthermore, the distribution and/or relative amount of fuel delivered from each injectors 208 and 210 may vary with operating conditions, such as engine load and/or knock. The relative distribution of the total injected fuel among injectors 208 and 210 may be referred to as an injection ratio. For example, injecting a larger amount of the fuel for a combustion event via port injector 208 may be an example of a higher injection ratio of port to direct injection, while injecting a larger amount of the fuel for a combustion event via direct injector 210 may be a lower injection ratio of port to direct injection. Additionally, it should be appreciated that port injected fuel may be delivered during an open intake valve event, closed intake valve event (e.g., substantially before an intake stroke, such as during an exhaust stroke), as well as during both open and closed intake valve operation.

Similarly, direct injected fuel may be delivered during an intake stroke, as well as partly during a previous exhaust stroke, during the intake stroke, and partly during the compression stroke, for example. Furthermore, the direct injected fuel may be delivered as a single injection or multiple injections, also referred to as single pulse or multiple pulses, respectively. These may include multiple injections during the compression stroke, multiple injections during the intake stroke, or a combination of some direct injections during the compression stroke and some during the intake stroke.

Fuel injectors 208 and 210 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 208 and 210, different effects may be achieved.

Figure 3:
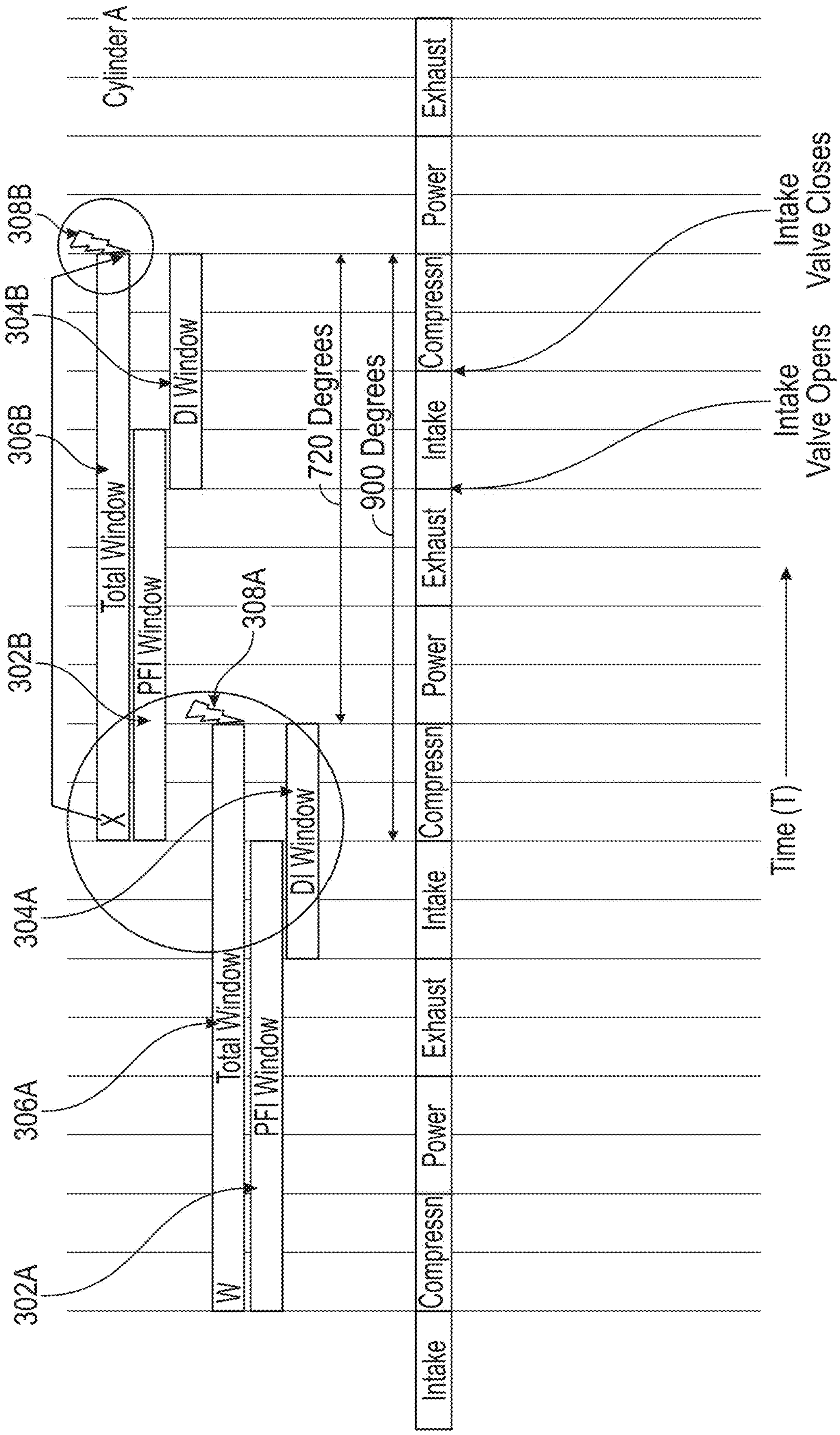
FIG. 3 is a plot of fuel injection opportunities for a four-stroke cycle of a cylinder of an internal combustion engine, according to an exemplary embodiment.

FIG. 3 shows a plot diagram of windows of fuel injection opportunities (also referred to as periods) for cylinder 202A of the ICE 102. The operational description of cylinder 202A is applicable for the other cylinders 202B, 202C, 202D of the ICE 102. During operation, cylinder 202A is configured to undergo a four stroke cycle utilizing a distillated petroleum or alcohol base fuel, such as gasoline and/or ethanol, and ignited by spark ignition. During an intake stroke, the exhaust valve 252 closes and intake valve 250 opens. Air is introduced into combustion chamber 202A via the intake manifold as the piston 206 moves to the bottom of the cylinder so as to increase the volume within combustion chamber 202A. Bottom dead center (BDC) is the position at the piston 206 is at the end of its stroke and near the bottom of the cylinder 202A. During the compression stroke, the intake valve 250 and exhaust valve 252 are closed. Piston 206 moves toward the cylinder head so as to compress the air within combustion chamber 202A. Top dead center (TDC) is the position of the piston 206 is at the end of its stroke and closest to the cylinder head.

Fuel is introduced into the combustion chamber by injecting fuel into the intake port by the port fuel injector 208 and/or by injecting fuel directly into the combustion chamber by the direct fuel injector 210 during the intake stroke and/or the compression stroke. Injecting fuel into the intake port is referred to as port fuel injection (PFI), injecting fuel directly into the combustion chamber is referred to as direct injection or (DI), and the combination of injecting fuel into the intake port and combustion chamber is referred to as port direct injection (PDI).

The windows of opportunity for PFI are represented by a bars 302A, 302B, also referred to as PFI periods 302A, 302B. The windows of opportunity for DI is represented by the bars 304A, 304B, also referred to as DI periods 304A, 304B. The total windows of opportunity for the combination of PFI and DI is represented by the bars 306A, 306B, also referred to as periods 306A, 306B. PFI of fuel occurs earlier in the total window of opportunity than DI injection of fuel. The injected fuel is ignited at 308A, 308B by ignition means 260 resulting in combustion, typically when the piston reaches TDC or near TDC. The ignition means 260 may include a spark plug 260 for initiating combustion. The spark plug 260 can generate an ignition spark in response to a spark request from the ECM 112. However, in some embodiments, the spark plug 260 may be omitted, such as where the ICE 102 may initiate combustion by auto-ignition or by injection of fuel as may be the case with some diesel engines. The ECM may deactivate selected cylinders by halting fuel delivery to the selected cylinders. Fuel delivery to the selected cylinders may be halted by not injecting fuel into the selected cylinders.

During the expansion stroke, the expanding combustion gases push the piston 206 back to BDC. The crankshaft 218 converts piston movement into a rotational torque of the rotary shaft. Finally, during the exhaust stroke, the exhaust valve 252 opens to release the combusted air-fuel mixture to exhaust passage 226 and the piston returns to TDC. A completed four stroke cycle results in 720 degrees of rotation of the crankshaft 218. The window of opportunity for fuel injection extends 900 degrees of rotation of the crankshaft 218 as determined from the beginning of the compression stroke of a four stroke cycle through the end of the compression stroke of the next the four stroke cycle.

As described above, FIG. 2 is an illustration of an exemplary cylinder 202A of a multi-cylinder ICE 102. The other cylinders 202B, 202C, 202D may similarly include their own set of intake/exhaust valves, fuel injectors, spark plug, etc. In some examples, ICE 102 may be an inline four-cylinder engine, a V-6 engine, V-8 engine, or other engine configuration. During standard engine operation, the ICE 102 is typically operated to fire each cylinder per engine cycle. Thus, for every 720 CA (e.g., two revolutions of the crankshaft), activated cylinders will be fired one time. An activated cylinder mean fuel is injected into the particular cylinder and spark-ignition occurs to effectuate the power stroke. To allow for combustion in each cylinder, each intake and exhaust valve is actuated at a specified time. Fuel is injected to each cylinder and the spark ignition system provides a spark to each cylinder at a specified time. Accordingly, for each cylinder, the spark ignites the fuel-air mixture to initiate combustion. Furthermore, during standard engine operation, one or more cylinders may be deactivated. Deactivated means that fuel in not injected into the deactivated cylinder, therefore there no combustion occurs during what otherwise would be the power-stroke.

During certain low-load operating conditions, the ICE 102 may operate in cylinder deactivation mode, meaning at least one cylinder is deactivated by halting fuel injection to that cylinder, thus no combustion even. Cylinder deactivation mode may be conducted during low load conditions such as when the vehicle 100 is traveling at a steady speed, coasting, or decelerating. When a designated cylinder is deactivated, the port injector 208 and the direct injector 210 are disabled. The spark plug 260 may be disabled as well. Absent of fuel or spark, combustion will not occur in the designated cylinder. As the load demand is increased, the designated cylinder may be activated by the ECM commanding the port injector 208 and/or the direct injector 210 to supply fuel to the particular cylinder by PFI and/or DI and activate the spark plug.

When there is a change in mode of fuel injection, such as from DI to PFI, DI to PDI, or PDI to PFI during a cylinder deactivation and/or activation request, the ICE 102 may exhibit certain inefficiencies that may result in non-desirable engine behaviors such as a momentary lapse in power which may be perceived as vehicle jerkiness by an occupant within the vehicle. Other inefficiencies include inefficient fuel injection into the designated cylinder resulting in lean combustion and increased in NOx emissions.

Figure 4:
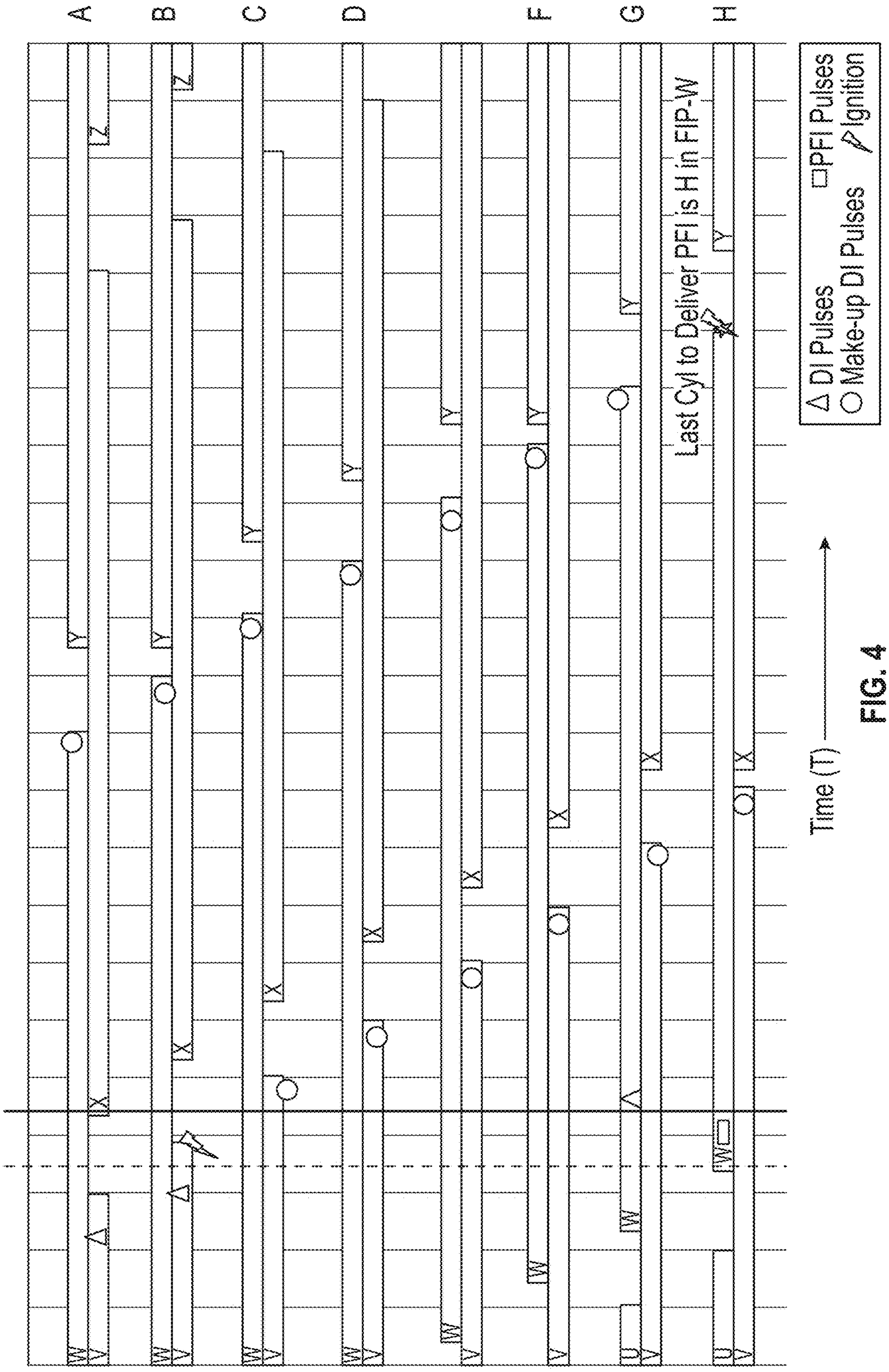
FIG. 4 is a plot of fuel injection opportunities for an internal combustion engine undergoing cylinder deactivation, according to an exemplary embodiment.

FIG. 4 is a plot of windows of fuel injection opportunities for an ICE 102 having a plurality of cylinders labeled A through H (e.g. 8 cylinders) undergoing deactivation mode. Deactivation mode means the halting of fuel delivery to one or more the plurality of cylinders. The windows of fuel injection opportunities, also referred to as periods, are represented by bars for each cylinder. In a non-limiting example, the ICE 102 is in an operating state, also referred to as running, in DI mode. Cylinders A and B have received a DI of fuel, also referred to as DI pulse, as indicated by the triangles in period V. Shortly after Cylinder B delivers its DI pulse in fuel injection period V, the ECM changes the fuel injection mode indicated by the dashed line (could be for a myriad of reasons) to PFI mode. Because the PFI pulses are scheduled early on (in this specific example and not meant to be limiting), Cylinder H injects a PFI pulse, as represented by the box representing fuel injection period W. Shortly after that, the ECM commands fueling to stop (also referred to as cylinder deactivation or disable) indicated by the solid line (this also could happen for a myriad of reasons). Once the fuel has been commanded off, the Method 600 recognizes that Cylinder H, fuel injection period W, is the last firing event. The Method 600 then works through all the cylinders A through H until the last firing event of Cylinder H to determine if any cylinders need an additional DI pulse, which is also referred to as make-up DI injection of fuel (represented by the red circle). The additional DI pulses maintained continuous operation of the ICE until the last firing event of Cylinder H. If the DI pulses that are shown in red circle were NOT delivered, then the ICE 102 would be dormant for multiple firing events and then abruptly have the firing event of cylinder H fuel injection period W. This could have many undesirable consequences; including an unpleasant feeling to the driver, and potential emissions increase. In summary, when the ICE is operating in DI mode and transitions into PFI mode or PDI mode during an engine deactivation command and a PFI pulse has been delivered to a cylinder before the engine deactivation command is implemented, a DI pulse is supplied to the remaining cylinders to keep the ICE running until the PFI pulse is ignited.

Figure 5:
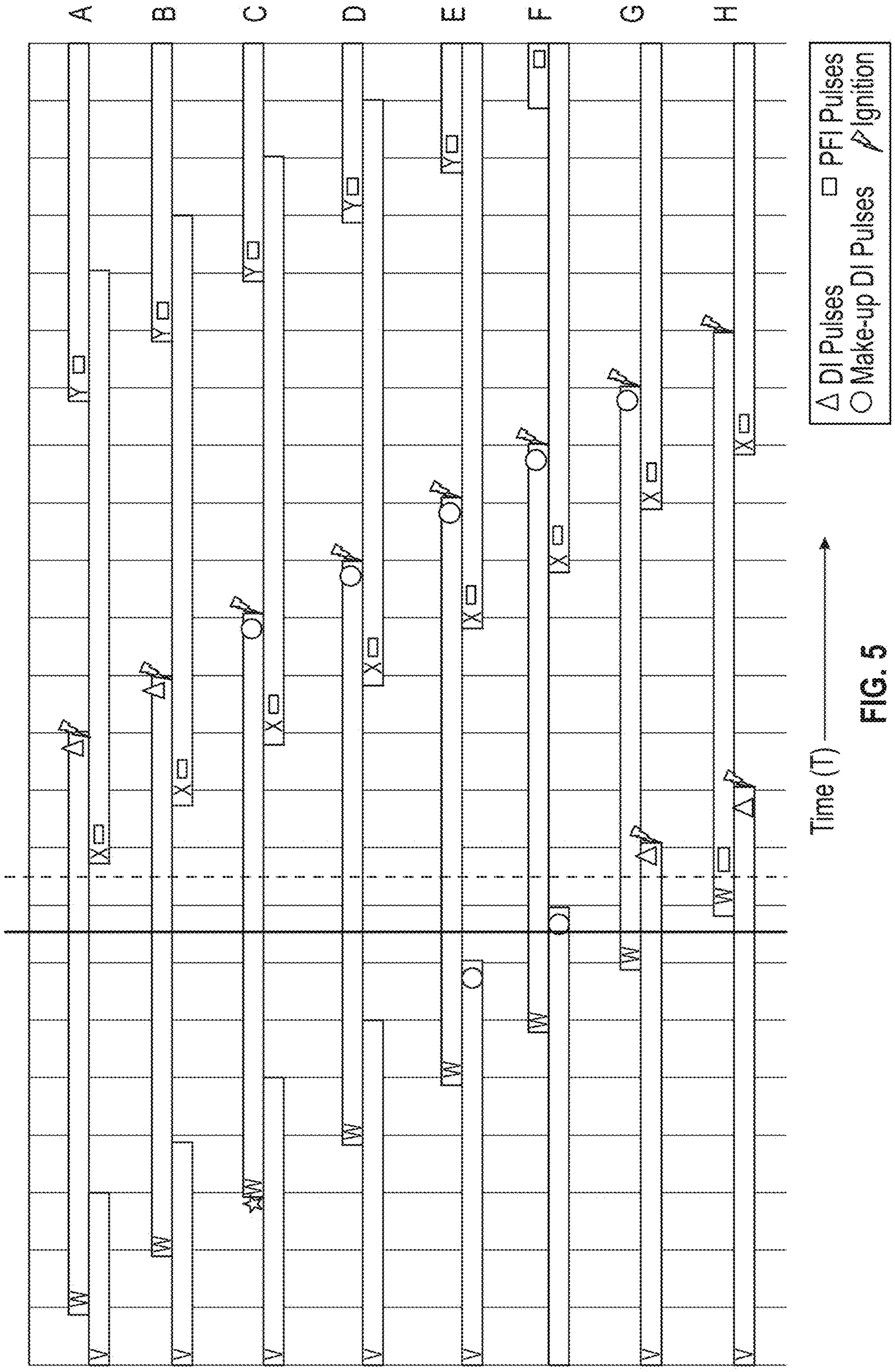
FIG. 5 is a plot of fuel injection opportunities for an internal combustion engine undergoing cylinder activation, according to an exemplary embodiment.

FIG. 5 is a plot of windows of fuel injection opportunities for an ICE 102 having a plurality of cylinders A through H (e.g. 8 cylinders) undergoing cylinder activation mode. activation mode means re-initiating fuel delivery to one or more the plurality of cylinders. The windows of fuel injection opportunities, also referred to as periods, are represented by horizontal bars for each cylinder. In the non-limiting example presented, the engine is NOT running to begin (e.g. the ICE is either off or motoring without undergoing combustion). A command to begin fueling is indicated by the solid line. Shortly after this, the fuel injection mode changes from DI to PFI indicated by the dashed line. Because the scheduling of the PFI pluses in this case is early, cylinder H delivers the first PFI pulse, represented by the box representing fuel injection period W. At this point in time, the scheduling for DI pulses as indicated by the triangles has already occurred for Cylinders G and H for fuel injection periods V, and for cylinders A and B fuel injection periods W. These DI pulses are shown as triangles. The method recognizes that there would be a gap in firing events from cylinder B fuel injection period W to cylinder H fuel injection period W, and therefore delivers supplemental DI fuel (represented by a circle), also referred to as make-up DI, to cylinders C, D, E, F, and G (all for fuel injection period W). This maintains continuous engine operation. If the make-up DI pulses that are shown in circles were NOT delivered, then the engine would be dormant for multiple firing events (in this case 5) and then abruptly resume firing. This could have many negative consequences; including an unpleasant feeling to the driver, and potential emissions increase, and less responsive power.

Figure 6A:
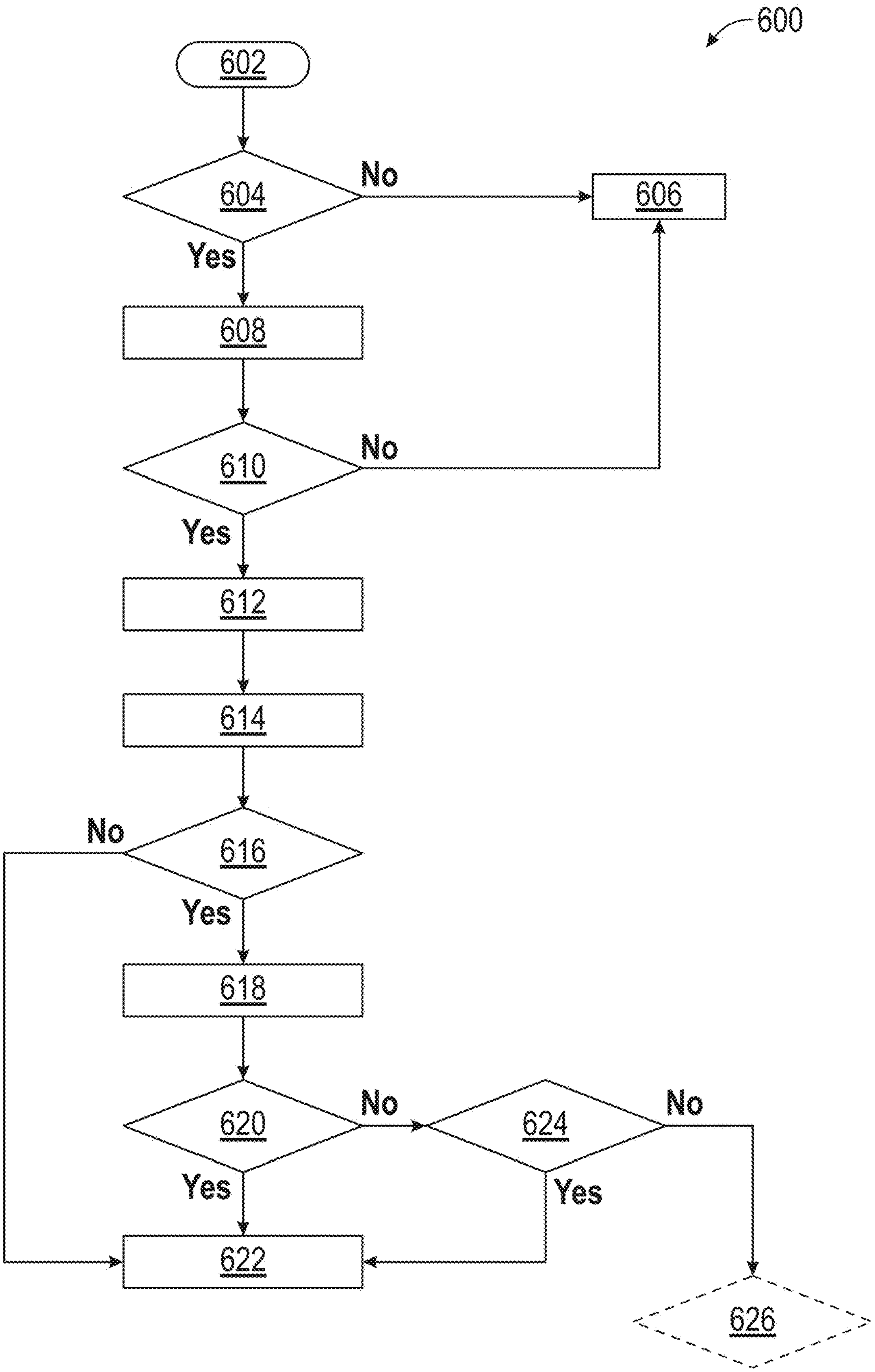
FIG. 6A is a flow block diagram of a method of operating an internal combustion engine having port and direct injectors during a cylinder deactivation command, according to an exemplary embodiment.
Figure 6B:
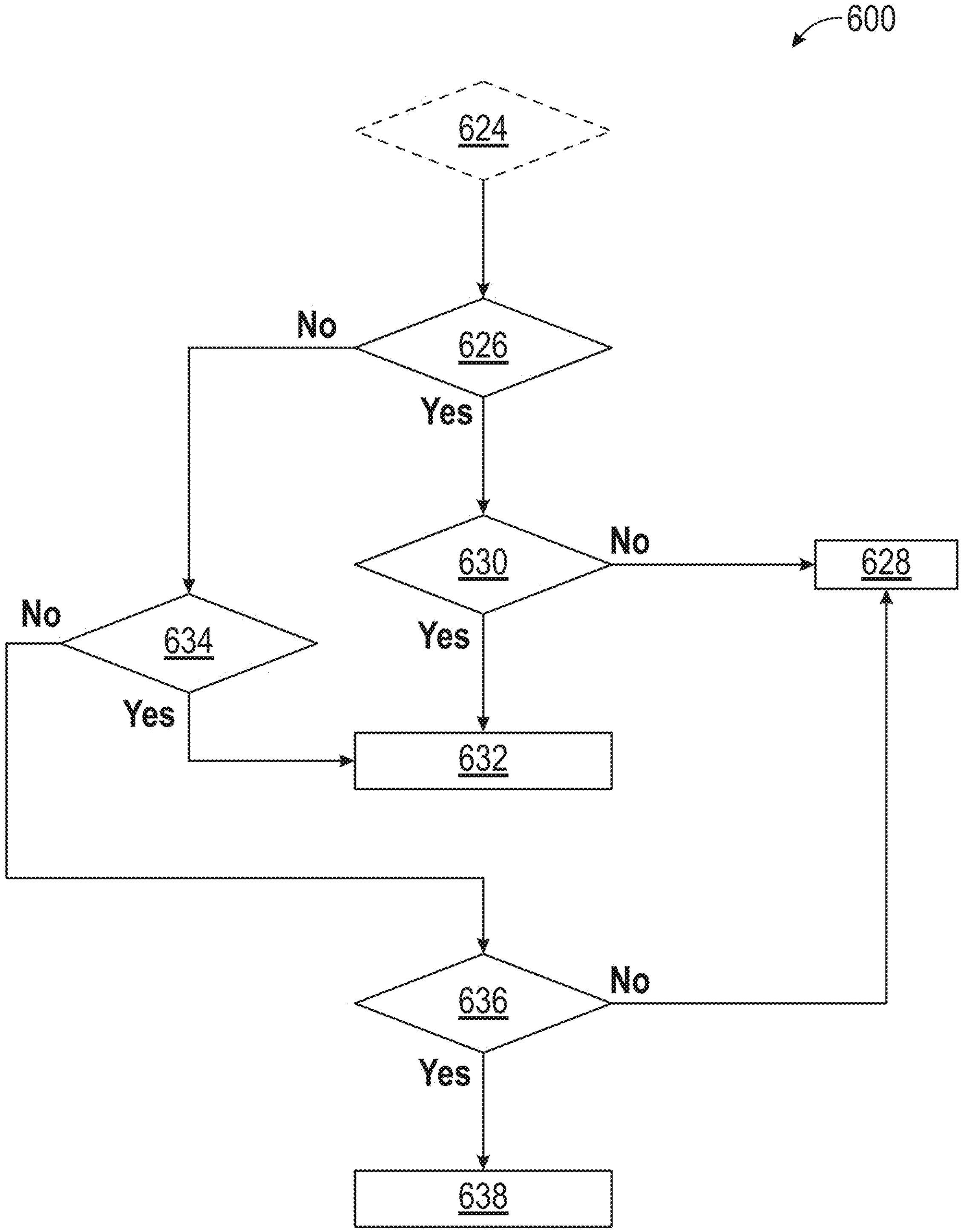
FIG. 6B is a continuation of the flow block diagram of FIG. 6A, according to an exemplary embodiment.

FIG. 6A, continued in FIG. 6B, is a flow block diagram of a method of operating an internal combustion engine 102 having port and direct injectors during a cylinder deactivation command (Method 600). The Method 600 begins at Block 602. At Block 602, an internal combustion engine 102 having a plurality of combustion chambers is in an operating mode. Operating mode, also referred to as running, means one or more combustion chambers are operating in direct injection mode (DI mode), port injection mode (PI mode), or a combination of DI mode and PI mode. The combination of DI and PI mode is also referred to as port direct injection mode (PDI mode). DI mode means fuel is injected directly into the combustion chamber by the direct fuel injector 210 and ignited to effectuate the power stroke. PI mode means fuel is injected into the intake port by the port fuel injector and is ignited once the fuel enters the combustion chamber to effectuate the power stroke. PDI mode means fuel is injected both in the intake port and directly in the combustion chamber, and the fuel is ignited within the combustion chamber to effectuate the power stroke. The combustion chamber is also referred to as a cylinder, however, it is not meant to limit the shape of the combustion chamber to a cylindrical shape. Proceeding to Block 604.

At Block 604, determine if the ECM is commanding, also referred to as requesting, to deactivate one or more of the plurality of cylinders by stopping fuel delivery to the one or more of the plurality of cylinders. Proceed to Block 608 in response to the ECM requesting to deactivate one or more of the plurality of cylinders by stopping fuel delivery to the one or more of the plurality of cylinders. Otherwise, proceed to Block 606 and the Method 600 ends.

At Block 608, determine whether one or more of the plurality of cylinders are transitioning from DI to PFI, DI to PDI, or from PDI to PFI at the same time or immediately after the ECM is requesting to deactivate one or more of the plurality of cylinders by stopping or halting fuel delivery to the one or more of the plurality of cylinders. Proceeding to Block 610.

At Block 610, proceed to Block 612 in response to one or more of the plurality of cylinders are determined to be transitioning from DI to PFI, DI to PDI, or from PDI to PFI at the same time the ECM is requesting to deactivate one or more of the plurality of cylinders. Otherwise the Method 600 proceeds to Block 606 and the Method 600 ends.

At Block 612, determine the global variables for the ICE related to windows (periods) of fuel injection opportunities and overlaps of such periods for each cylinder during the ECM request to deactivate one or more of the plurality of cylinders The global variables includes, but not limited to, injection mode, firing order of the cylinders, designated cylinders to be deactivated, a sequence of order that the designated cylinders are to be deactivated, the last to be fired cylinder, if any of the cylinders actually received an actual PFI before are the cylinders are disabled, valve timing, and other global variables necessary for the operation of the ICE such as engine speed, load, MAP, MAF, commanded air/fuel ratio, etc. Proceeding to Block 614.

At Block 614, based on the determined global variables of Block 612, determine the number of engine crank degrees required to complete the deactivation of the designated cylinders. Proceeding to Block 616.

At Block 616, in response to one or more of the cylinders having received an actual PFI injection of fuel, the Method 600 proceeds to Block 618. Actual PFI injection of fuel means a cylinder is supplied with fuel via PFI during the command to deactivate the cylinder. In response to the one or more designated cylinders NOT having an actual PFI of fuel, the Method 600 proceeds to Block 622. At Block 622, the ECM determines that an override is not needed to supply make-up DI of fuel.

At Block 618, determine the individual cylinder operating variables for each of the plurality of cylinders. The individual cylinder operating variables include, but are not limited to, whether the individual cylinder is in an activated mode or deactivated mode, the current and upcoming periods of injection, whether the individual cylinder has transitioned from DI to PFI, from DI to PDI, or from PDI to PFI at the same time the ECM is requesting to deactivate one or more of the plurality of cylinders, and other related factors. If the individual cylinder has transitioned into the PFI mode, then determine whether the individual cylinder received an actual PFI injection of fuel. If the individual cylinder received an actual PFI injection of fuel, then determine whether the ECM has initiated calculation for the next period of fuel injection opportunity. Proceeding to Block 620.

At Block 620, in response a particular individual cylinder determined to be in deactivated mode (e.g. disabled) during the ECM request to deactivate one or more of the plurality of cylinders, the Method 600 proceeds to Block 622. At Block 622, no override is required for the particular individual cylinder. In response the particular individual cylinder determined to be in activated mode (e.g. enabled) during the ECM request to deactivate one or more of the plurality of cylinders, the Method 600 proceeds to Block 624.

At Block 624, in response a particular individual cylinder determined to have transitioned into the PFI mode during the ECM request to deactivate one or more of the plurality of cylinders, the Method 600 proceeds to Block 622. At Block 622, no override is required for the particular individual cylinder. In response a particular individual cylinder determined to have NOT transitioned into the PFI mode during the ECM request to deactivate one or more of the plurality of cylinders, the Method 600 proceeds to Block 626.

At Block 626, in response to a particular cylinder determined to have received an actual PFI injection of fuel, the Method 600 proceeds to Block 630.

A Block 630, in response to the particular cylinder determined to have transitioned into the PFI mode and the calculation for the next period of fuel injection opportunity has NOT been initiated resulting in the PFI will combust in the upcoming event, the Method 600 proceeds to Block 632. Otherwise the Method proceeds to Block 628, no override is required for the particular individual cylinder.

At Block 632, the particular cylinder is injected with make-up DI fuel injection for the upcoming spark event. The DI fuel injection is to complete the DI portion of the PDI mode, or because the particular cylinder was disabled before the actual PFI injection has occurred and needed to be compensated with make-up DI to avoid the gaps of the disabled cylinders.

Referring back to Block 626. In response to a particular cylinder determined to have NOT received an actual PFI injection of fuel, the Method 600 proceeds to Block 634.

At Block 634, in response to the particular cylinder transitioning into PDI mode during the deactivation command, the Method 600 proceeds to Block 632, the particular cylinder is injected with make-up DI fuel injection for the upcoming spark event. In response to the particular cylinder NOT transitioning into PDI mode during the deactivation command, the Method proceeds to Block 636.

At Block 636, in response to the particular cylinder transitioning into DI mode during the deactivation command, the Method 600 proceeds to Block 638. At Block 638, the cylinder is injected with DI for the upcoming spark event. The Cylinder needed to be only injected with DI because no PFI injection happened.

Referring back to Block 636, in response to the particular cylinder NOT transitioning into DI mode during the deactivation command, the Method proceeds to Block 628. At Block 628, no override is required for the particular individual cylinder.

Figure 7:
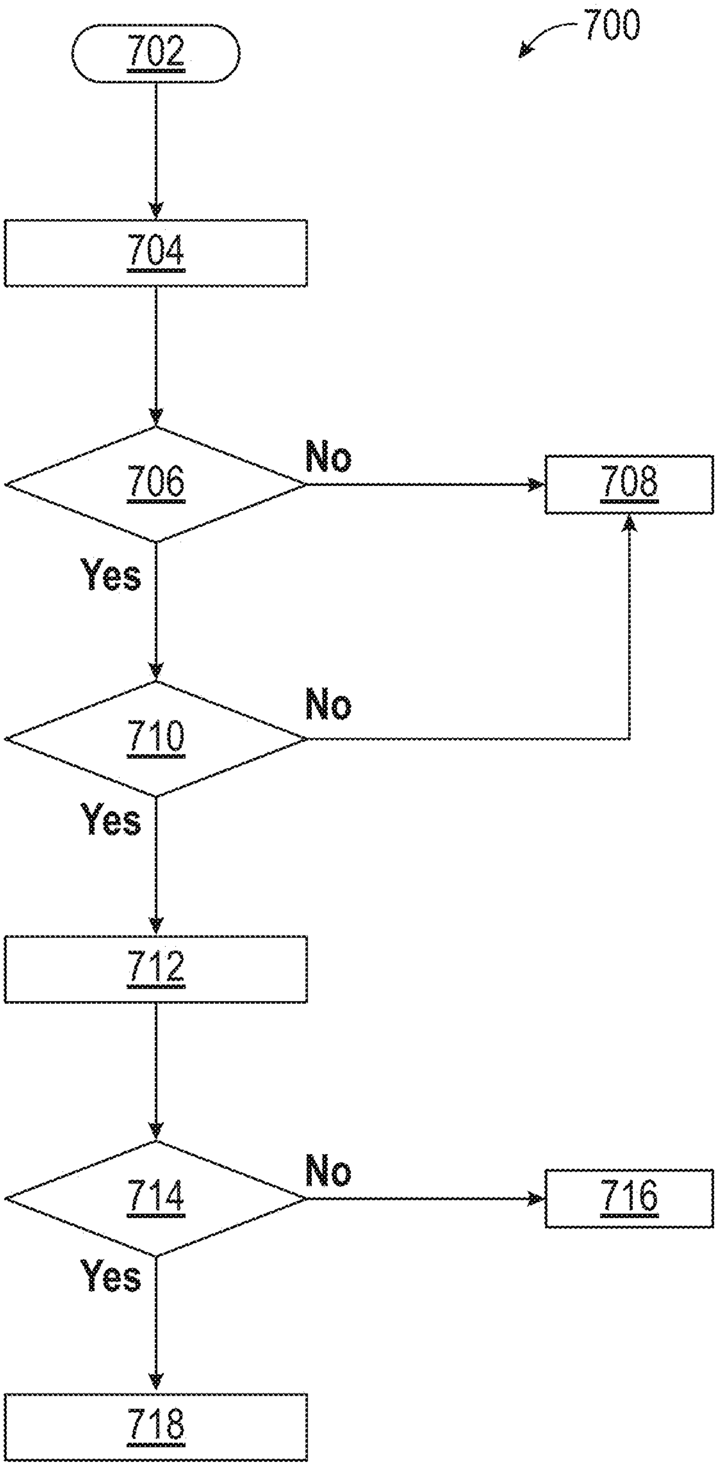
FIG. 7 is a flow block diagram of a method of operating an internal combustion engine having port and direct injectors during a cylinder activation command, according to an exemplary embodiment.

FIG. 7 is a flow block diagram of a method of operating an internal combustion engine having port and direct injectors during a cylinder activation (enable) command (Method 700). The Method 700 transitions all the cylinders in the firing order into the enable-request and avoids intermittent occurrence of cylinders being deactivated, also referred to as OFF, during the transition into a fuel enablement. The Method 700 begins at Block 702.

At Block 702, in a non-limiting example, the internal combustion engine includes a plurality of deactivated cylinders. Deactivated or disabled cylinders means no fuel is supplied to the cylinders. The ECM is requesting to enable the deactivated cylinders by supplying fuel to one or more of the deactivated cylinders. Proceeding to Block 704.

At Block 704, the ECM determines whether any of the deactivated cylinders is to be transitioned from DI to PFI mode or from DI to PDI injection mode. Proceeding to 706.

At Block 706, in response to any of the deactivated cylinders is determined to be transitioned from DI mode to PFI mode or from DI to PDI mode, the Method 700 proceeds to Block 710. Otherwise the Method 700 proceeds to Block 708 and the Method 700 ends.

At Block 710, in response to the ECM request to enable one or more of the deactivated cylinders, the Method 700 proceeds to Block 712. Otherwise, the method proceeds to Block 708 and the Method 700 ends.

At Block 712, the ECM determines whether each of the deactivated cylinders is to be transitioned from DI mode to PFI mode or from DI mode to PDI mode during the ECM request to enable the deactivated cylinders. Proceeding to Block 714.

At Block 714, for each individual cylinder, the ECM determines one of: (i) it is too late for an PFI of fuel for an upcoming spark event; OR (ii) the upcoming injection mode is a PDI mode, AND the individual has been cylinder enabled, AND the individual cylinder received an actual PFI. In response to the (i) or (ii) is true, the method proceeds to Block 718, otherwise the Method 700 proceeds to Block 716. At Block 716, the ECM determines that an override to inject make-up DI is not required for the individual cylinder.

At Block 718, for the upcoming (i.e. next) spark event, the individual cylinder is injected with make-up DI of fuel to complete the fuel injection to either finish the DI portion of the PDI mode or to avoid ignition gaps of enabled cylinders because the cylinder was enabled such that PFI injection could not occur.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A system of operating an internal combustion engine (ICE) having a plurality of cylinders, comprising:

port fuel injectors configured to port inject fuel to each cylinder of the plurality of cylinders;

direct fuel injectors configured to direct inject fuel to each cylinder of the plurality of cylinders; and an engine control module (ECM) in communication with the port fuel injectors and direct fuel injectors, wherein the ECM is configured to:

selectively deactivate each cylinder of the plurality cylinders by halting fuel injection into each cylinder of the plurality of cylinders;

selectively transition fuel injection modes for each cylinder of the plurality of cylinders between a direction injection (DI) mode, a port fuel injection (PFI) mode, and a port direct injection (PDI) mode; and a non-transitory memory containing instructions when executed by a processor causes the ECM to:

command a deactivation of at least one of the plurality of cylinders;

transition at least one of the plurality of cylinders from the DI mode to the PFI mode, from the DI mode to the PDI mode, or from the PDI mode to the PFI mode;

determine a first cylinder is not already disabled during the command to deactivate;

determine the first cylinder did NOT transition into a PFI mode during the command to deactivate;

determine the first cylinder received an actual PFI injection during the command to deactivate;

determine the first cylinder transitioned into a PFI mode during the command and a calculation for next fuel injection period has NOT started; and inject a first make-up direct injection of fuel into the first cylinder for a next combustion event of the first cylinder.

2. The system of claim 1, wherein the instructions when executed by a processor further causes the ECM to:

determine a second cylinder is not already disabled during the command to deactivate;

determine the second cylinder did NOT transition into a PFI mode during the command to deactivate;

determine the second cylinder did NOT receive an actual PFI injection during the command to deactivate;

determine the second cylinder transitioned into PDI mode during the command to deactivate; and inject a second make-up direct injection of fuel into the second cylinder for a next combustion event of the second cylinder.

3. The system of claim 2, wherein the instructions when executed by a processor further causes the ECM to:

determine a third cylinder is NOT already disabled during the command to deactivate;

determine the third cylinder did NOT transition into a PFI mode during the command to deactivate;

determine the third cylinder did NOT receive an actual PFI injection during the command to deactivate;

determine the third cylinder did NOT transition into PDI mode during the command to deactivate;

determine the third cylinder transition into DI mode during the command to deactivate; and inject a third make-up direct injection of fuel into the third cylinder for a next combustion event of the third cylinder.

4. The system of claim 3, wherein the instructions when executed by a processor further causes the ECM to:

determine a firing sequence of the plurality of cylinders; and inject the first make-up direct injection of fuel into the first cylinder, inject the second make-up direct injection of fuel into the second cylinder, and inject the third make-up direct injection of fuel into the third cylinder based on the determined firing sequence of the plurality of cylinders.

5. The system of claim 4, wherein the transition at least one of the plurality of cylinders from DI mode to PFI mode, from DI mode to PDI mode, or from PDI mode to PFI mode occurs in in sequence corresponding to the determined firing sequence of the plurality of cylinders after the command to deactivate.

6. The system of claim 1, wherein the instructions when executed by a processor further causes the ECM to:

determine the transition of at least one of the plurality of cylinders from the DI mode to the PFI mode, from the DI mode to the PDI mode, or from the PDI mode to the PFI mode occurred after the command to deactivate and determined at least one of the plurality of cylinders received an actual PFI injection of fuel before determining at least one of the first, second, or third cylinder is NOT already disabled.

7. The system of claim 1, wherein the commanded deactivation of at least one of the plurality of cylinders comprises halting fuel injection to the at least one of the plurality of cylinders.

8. The system of claim 1, wherein the ECM is further configured to selectively command activation of disabled cylinders; and wherein the instructions when executed by a processor further causes the ECM to:

command activation of at least one disabled cylinder;

determine the at least one disabled cylinder is transitioning from direction injection (DI) mode to port fuel injection (PFI) mode;

determine a port fuel injection (PFI) of fuel into the at least one disabled cylinder is late based on a predetermined window of fuel injection opportunity; and inject a make-up direct injection of fuel into the at least one disabled cylinder.

9. The system of claim 8, wherein the instructions when executed by a processor further causes the ECM to:

determine at least one enabled cylinder transitioning from DI mode to PDI mode;

determine the at least one enabled cylinder received an actual PFI injection; and inject make-up DI of fuel to the at least one disabled cylinder.

10. The system of claim 8, wherein the instructions when executed by a processor further causes the ECM to:

determine the fuel injection mode is transitioning from at least one of a direct injection (DI) mode to a port fuel injection (PFI) mode, and from DI mode to port direct injection (PDI) mode during the command to activate of the at least one cylinder at the time of the command activation.

11. A method of operating an internal combustion engine (ICE) have a plurality of cylinders, comprising:

commanding a deactivation of at least one cylinder of the ICE;

determining for a first cylinder of the plurality of cylinders:

the first cylinder is not already disabled during the command to deactivate;

the first cylinder did NOT transition into a PFI mode during the command to deactivate;

the first cylinder received an actual PFI injection during the command to deactivate;

the first cylinder transitioned into a PFI mode during the command and a next fuel injection period has NOT started; and injecting a first make-up direct injection of fuel into the first cylinder for a next combustion event of the first cylinder.

12. The method of claim 11, further comprising:

determining for a second cylinder of the plurality of cylinders:

the second cylinder is not already disabled during the command to deactivate;

the second cylinder did NOT transition into a PFI mode during the command to deactivate;

the second cylinder did NOT receive an actual PFI injection during the command to deactivate;

the second cylinder transitioned into PDI mode during the command to deactivate; and injecting a second make-up direct injection of fuel into the second cylinder for a next combustion event of the second cylinder.

13. The method of claim 12, further comprising:

determining for a third cylinder of the plurality of cylinders:

the third cylinder is NOT already disabled during the command to deactivate;

the third cylinder did NOT transition into a PFI mode during the command to deactivate;

the third cylinder did NOT receive an actual PFI injection during the command to deactivate;

the third cylinder did NOT transition into PDI mode during the command to deactivate;

the third cylinder transition into DI mode during the command to deactivate; and injecting a third make-up direct injection of fuel into the third cylinder for a next combustion event of the third cylinder.

14. The method of claim 13, further comprising:

determining a firing sequence of the plurality of cylinders;

injecting the first make-up direct injection of fuel into the first cylinder; injecting the second make-up direct injection of fuel into the second cylinder; and injecting the third make-up direct injection of fuel into the third cylinder corresponding to the determined firing sequence of the plurality of cylinders.

15. The method of claim 11, wherein commanding a deactivation of at least one cylinder of the ICE comprises halting fuel injection to the at least one cylinder.

16. The method of claim 11, further comprises determining a fuel injection mode transition of the at least one cylinder after commanding the deactivation of at least one cylinder and before determining the first cylinder is not already disabled.

17. The method of claim 16, wherein the fuel injection mode transition includes determining at least one of from a direct injection (DI) mode to a port fuel injection (PFI) mode, from the DI mode to a port direct injection mode (PDI) mode, and from the PDI mode to the PFI mode.

18. A method of operating an internal combustion engine, comprising:

commanding an activation of at least one cylinder;

determining the at least one cylinder is transitioning from direction injection (DI) mode to port fuel injection (PFI) mode;

determining a port fuel injection (PFI) of fuel into the at least one cylinder is late based on a predetermined window of fuel injection opportunity; and injecting a make-up direct injection of fuel into the at least one cylinder for a next combustion event.

19. The Method of claim 18 further comprising:

determining another of the at least one cylinder is transitioning from direction injection (DI) mode to port direct injection (PDI) mode;

determining the other of at least one cylinder received an actual PFI injection; and injecting a make-up direct injection of fuel into the at least one cylinder for a next combustion event.

20. The method of claim 19, further comprising:

determining the fuel injection mode is transitioning from at least one of a direct injection (DI) mode to a port fuel injection (PFI) mode and DI mode to port direct injection (PDI) mode during the command to activate of the at least one cylinder.

* * * * *